(12) United States Patent
Brickous

(10) Patent No.: US 8,812,231 B1
(45) Date of Patent: Aug. 19, 2014

(54) GPS GUIDED WALKING CANE

(76) Inventor: Rebecca Brickous, Salisbury, MD (US)

( * ) Notice: Subject to any disclaimer, the term of this patent is extended or adjusted under 35 U.S.C. 154(b) by 178 days.

(21) Appl. No.: 13/533,479

(22) Filed: Jun. 26, 2012

(51) Int. Cl.
  *G01C 21/10* (2006.01)
(52) U.S. Cl.
  USPC ............................................. 701/488
(58) Field of Classification Search
  CPC ..... G01C 21/00; G01C 21/3608; B60R 25/33
  USPC ............................................ 701/488
  See application file for complete search history.

(56) References Cited

U.S. PATENT DOCUMENTS

| | | |
|---|---|---|
| D242,880 S | 12/1976 | Rex, Jr. |
| 5,097,856 A | 3/1992 | Chi-Sheng |
| 5,687,136 A | 11/1997 | Borenstein |
| 5,973,618 A | 10/1999 | Ellis |
| 6,853,909 B2 | 2/2005 | Scherzinger |
| 7,267,281 B2 | 9/2007 | Hopkins |

*Primary Examiner* — Thomas G Black
*Assistant Examiner* — Luke Huynh
(74) *Attorney, Agent, or Firm* — Kyle A Fletcher, Esq.

(57) ABSTRACT

The GPS guided walking cane includes a walking cane or stick that allows for attachment of a computing means that is specially adapted for visually impaired end users. The computing means includes a smart phone or mini computer that includes, a GPS unit coupled to inputting and outputting means for visually impaired end users. The inputting means includes a keypad that is Braille-based, whereas the outputting means is a display having Braille-based output locales thereon. The computing means further includes a speaker that provides audible feedback to the end user such that the end user may use the walking cane or stick and follow audible directions in order to stay on a planned route.

11 Claims, 3 Drawing Sheets

GPS GUIDED WALKING CANE

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

A. Field of the Invention

The present invention relates to the field of Walking canes; more specifically, a walking cane, or stick that include a GPS guidance system integrated therein.

Walking canes and sticks have been around for a long time, and help those that are visually impaired or those that need assistance in walking. Visually impaired persons typically walk with a walking cane or stick in order to feel the space immediately in front of the end user in order to sense where he or she is walking. There are some limitations of use with a walking cane or stick in that the end user may not know exactly where he or she is going, and may get lost in the course of feeling the path of which they are walking. There have been many attempts to provide navigational services in conjunction with a walking cane or stick in order to provide better guidance as to provide a computing means that is detachable with respect to the walking cane or stick, and secondly, do not provide inputting and outputting means specifically adapted for use with the visually impaired.

The device of the present application seeks to address this need by providing a walking cane or stick that includes a detachable computing means that is solely and uniquely adapted for interactive use with a visually impaired end user.

B. Discussion of the Prior Art

As will be discussed immediately below, no prior art discloses a GPS guided walking cane or stick that is comprised of a walking cane or stick upon which attaches a computing means in the form of a smart phone or small computer that is dieted to use with the visually impaired end user; wherein the computing means is uniquely adapted for use with the walking cane or stick, and includes a GPS unit that communicates with a processor that in turn communicates with the end user via a speaker, inputting means and outputting means; wherein the inputting means includes a keypad that is Braille-based, whereas the outputting means is a display having Braille-based output locales thereon; wherein the computing means provides audible directions to the end user whom is carrying the walking cane or stick in order to safely direct the end user along an inputted route.

The Scherzinger Patent (U.S. Pat. No. 6,853,909) discloses a walking stick with integral GPS navigation system. However, the walking stick does not feature a small computer or smart phone that attaches thereon, and which enables a visually-impaired end user to interact therewith for navigational purposes when using the associated walking stick.

The Ellis Patent (U.S. Pat. No. 5,973,618) discloses a walking stick for the visually impaired, which has electronics integrated into it that include voice activation and response as well as navigation and alerts. However, the walking stick does not feature a detachable GPS unit and computing means specifically adapted for a visually-impaired end user to interact with in order to provide navigational services associated with said walking stick.

The Borenstein Patent (U.S. Pat. No. 5,687,136) discloses a personal navigation system for visually impaired people in which the navigation system is attached to a walking aid. However, the navigation system is not a detachable computing means associated for use with a walking cane or stick.

The Chi-Sheng Patent (U.S. Pat. No. 5,097,856) discloses a talking cane for a blind person that will help them navigate a path which may have dangerous obstacles. Again, the talking cane does not include a detachable computing means with inputting means and outputting means hat are Braille-based, and which works in conjunction with a walking stick or cane to provide navigational services in connection with a visually impaired end user.

The Hopkins Patent (U.S. Pat. No. 7,267,281) discloses a walking stick or cane for the blind or visually impaired that has an environmental sensing apparatus for directing the person safely. Again, the walking stick or cane does not include a detachable engaged computing means having inputting and outputting means that are Braille-based, and which work to provide navigational services for use with said walking stick or cane.

While the above-described devices fulfill their respective and particular objects and requirements, they do not describe a GPS guided walking cane or stick that is comprised of a walking cane or stick upon which attaches a computing means, in the form of a smart phone or small computer that is directed to use with the visually impaired end user; wherein the computing means is uniquely adapted for use with the walking cane or stick, and includes a GPS unit that communicates with a processor that in turn communicates with the end user via a speaker, inputting means and outputting means; wherein the inputting means includes a keypad that is Braille-based, whereas the outputting means is a display having Braille-based output locales thereon; wherein the computing means provides audible directions to the end user whom is carrying the walking cane or stick in order to safely direct the end user along an inputted route. In this regard, the GPS guided walking cane departs from the Conventional concepts and designs of the prior art.

SUMMARY OF THE INVENTION

The GPS guided walking cane includes a walking cane or stick that allows, for attachment of a computing means that is specially adapted for visually impaired end users. The computing means includes a smart phone or mini computer that includes a GPS unit coupled to inputting and outputting means for visually impaired end users. The inputting means includes a keypad that is Braille-based, whereas the outputting means is a display having Braille-based output locales thereon. The computing means further includes a speaker that provides audible feedback to the end user such that the end user may use the walking cane or stick and follow audible directions in order to stay on a planned route.

Another object of the invention is to provide a walking cane or stick that includes a computing means that can attach thereon, and which is specially adapted for inputting and outputting information to a visually impaired end user, and which can emit audible instructions to aid the end user along a pre-planned route.

A further object of the invention is to provide a computing means in the form of a smart phone or miniature computer that can easily attach onto or detach from the walking cane or stick.

A further object of the invention is to provide a computing means that includes inputting means that involves the use of a Braille-based keypad.

A further object of the invention is to provide a computing means that includes an outputting means in the form of a Braille-based output locales on a display, which the end user can feel and interact with the computing means.

A further object of the invention is to provide a speaker that formulates audible instructions to guide the end user along a pre-planned route.

These together with additional objects, features and advantages of the GPS guided walking cane will be readily apparent to those of ordinary skill in art upon reading the following detailed description of presently preferred, but nonetheless illustrative, embodiments of the GPS guided walking cane when taken in conjunction with the accompanying drawings.

In this respect, before explaining the current embodiments of the GPS guided walking cane in detail, it is to be understood that the GPS guided walking cane is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the GPS guided walking cane.

It is therefore important that the claims be regarded as including such equivalent construction insofar as they do not depart from the spirit and scope of the GPS guided walking cane. It is also to be understood that the phraseology and terminology employed herein are for purposes of description and should not be regarded as limiting.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE EMBODIMENT

Figure 1:
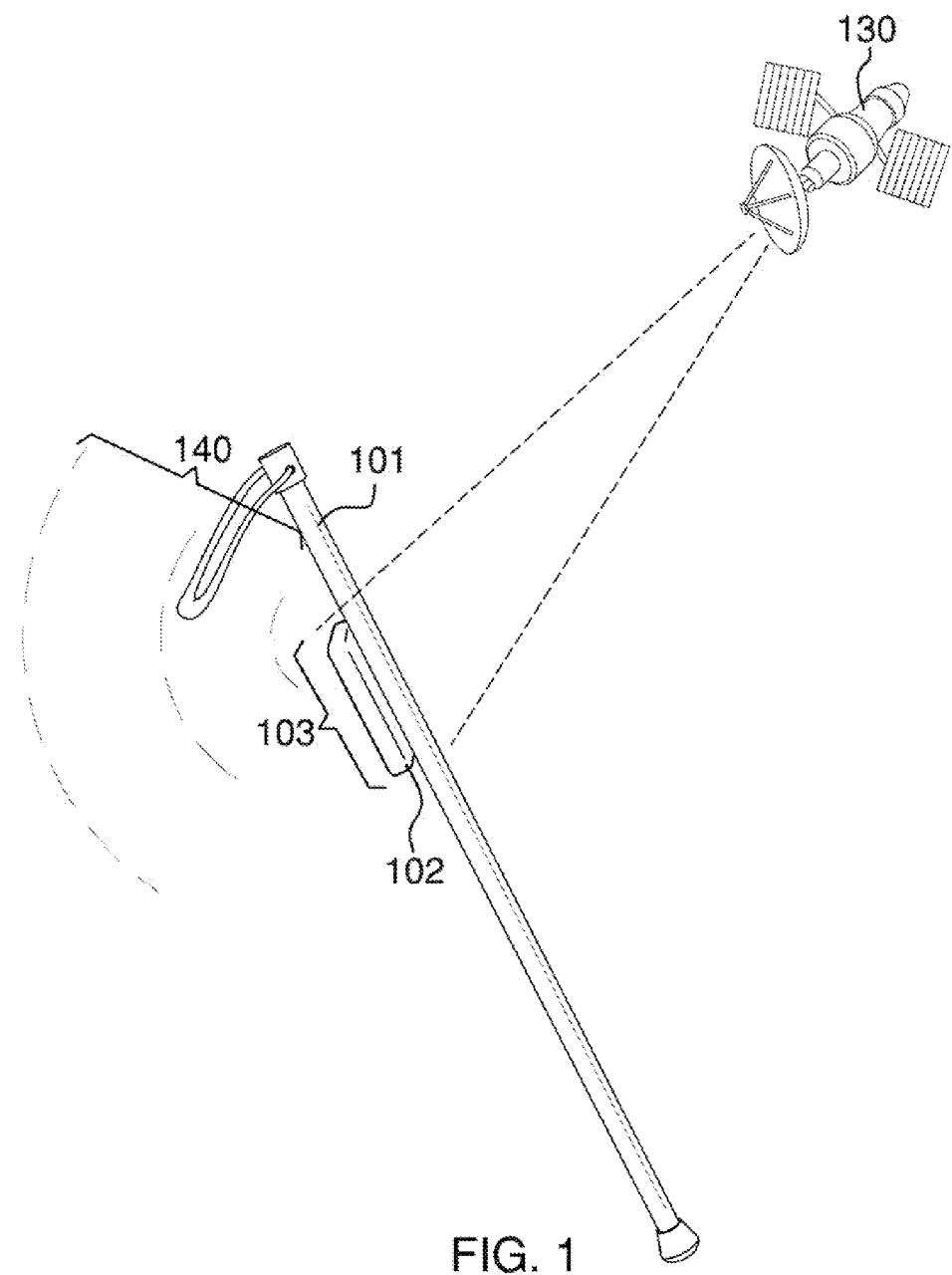
FIG. 1 illustrates a view of the GPS guided walking cane in communication with a satellite and emitting an audible instruction from the computing means.
Figure 2:
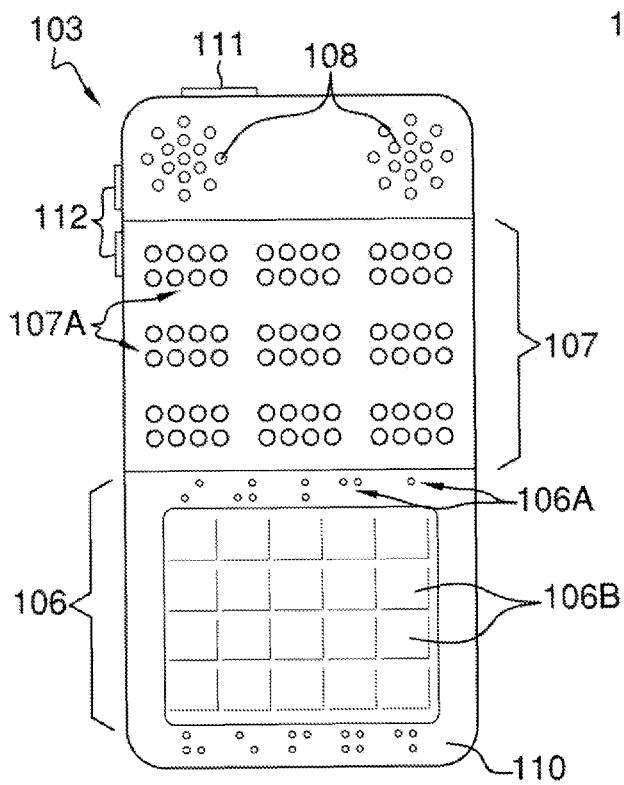
FIG. 2 illustrates a front view of the computing means having inputting means and outputting means provided on the front surface.
Figure 3:
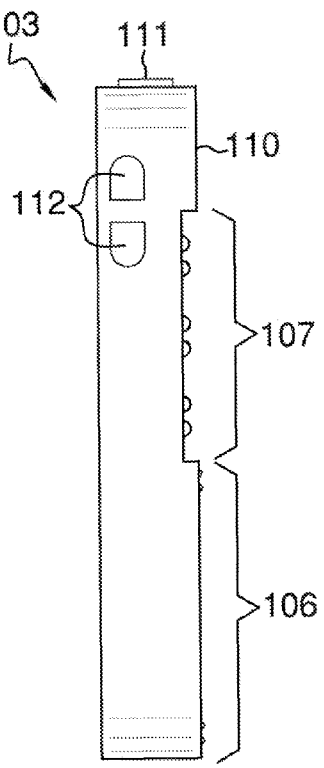
FIG. 3 illustrates a side view of the computing means.
Figure 4:
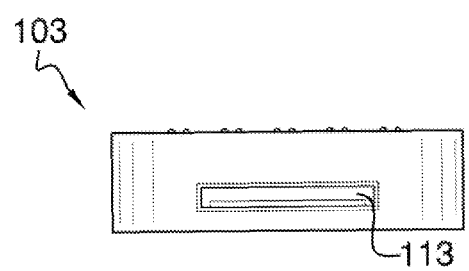
FIG. 4 illustrates a bottom view of the computing means.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to the preferred embodiment of the present invention, examples of which are illustrated in FIGS. 1-5. A GPS guided walking cane 100 (hereinafter invention) includes a walking cane or stick 101 of an unspecified length, and including a pocket 102 provided thereon, and for use with the temporary attachment of a computing means 103.

The computing means 103 is a relatively small object when compared to the walking cane or stick 101. The computing means 103 is a miniature computer or smart phone that includes a central processing unit 104 (hereinafter CPU) that is in wired communication with a global positioning unit 105 (hereinafter GPS). The CPU 104 is also in wired communication with an inputting means 106, an outputting means 107, a speaker 108, a powering means 109.

The inputting means 106 is essentially a Braille-based keypad that includes Braille dots 106A either on or adjacent individual keys 106B to communicate the meaning of the respective key 106B when depressed.

The outputting means 107 includes a plurality of Braille based output locales 107A thereon. The output locales 107A each include a plurality of dots that can go up or down to form a letter in Braille.

The inputting means 106 and the outputting means 107 are well known in the art associated with Braille-based typewriters. Moreover, the inputting means 106 and the outputting means 107 are both located on a front surface 110 of the computing means 103 along with the speaker 108.

The computing means 103 also includes an on/off button 111, a volume control 112, and a connection port 113, which are all collectively in wired communication with the CPU 104. The on/off button 111, the volume control 112, and the connection port 113 are located on individual surfaces, and not on the front surface 110. The computing means 103 enables a visually impaired person to input and receive output with the computing means 103 in the form of the inputting means 106, the outputting means 107, and the speaker 108. Moreover, a visually impaired person can communicate a destination into the computing means 103, and can follow audible instructions generated with the speaker 108 while manipulating the walking cane or stick 101.

The connection port 113 enables the computing means 103 to recharge the powering means 109 via a rechargeable/computer input cable 114.

Figure 5:
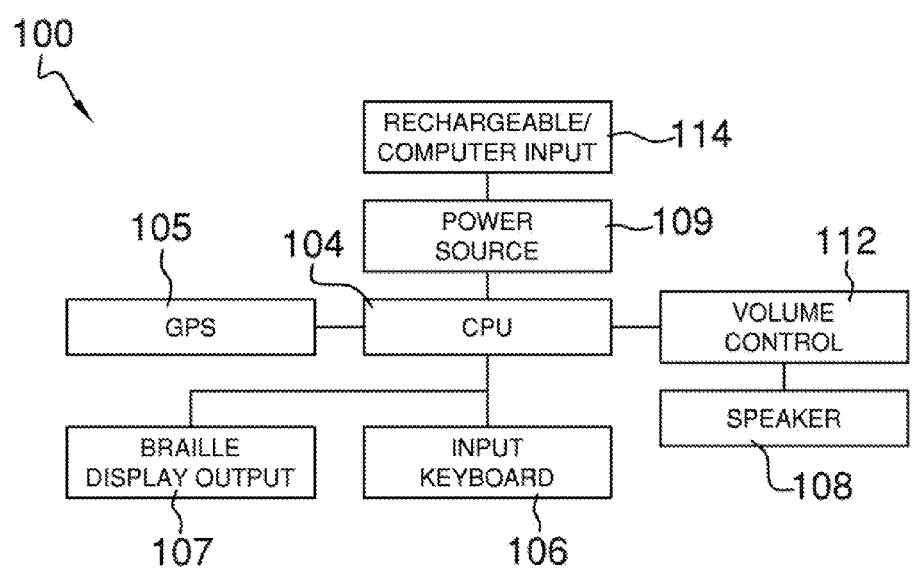
FIG. 5 illustrates a block diagram of the componentry associated with the computing means.

Referring to FIGS. 1 and 5, the GPS 105 communicates with a GPS satellite 130 in order to determine the location of the invention 100. The computing means 103 provides audible instructions 140 via the speaker 108 in order for an end user to follow a route to a pre-planned destination.

With respect to the above description, it is to be realized that the optimum dimensional relationship for the various components of the invention 100, to include variations in size, materials, shape, form, function, and the manner of operation, assembly and use, are deemed readily apparent and obvious to one skilled in the art, and all equivalent relationships to those illustrated in the drawings and described in the specification are intended to be encompassed by the invention 100.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A GPS guided walking cane comprising:
   a walking cane or stick having a pocket thereon for temporary attachment of a computing member thereto;
   wherein the computing member includes a CPU and GPS that are wired to one another;
   wherein the CPU is wired to an inputting member, an outputting member, and a speaker such that a destination is entered therein, and a route planned whereby audible instruction is given as to where to follow along said route while walking with said walking cane or stick;
   wherein the inputting member includes a Braille-based keypad that includes Braille dots either on or adjacent individual keys to communicate the meaning of the respective key when depressed.

2. The GPS guided walking cane as described in claim 1 wherein the outputting member includes a plurality of Braille-based output locales thereon; wherein the output locales each include a plurality of dots that can go up or down to form a letter in Braille.

3. The GPS guided walking cane as described in claim 2 wherein the inputting member and the outputting member are both located on a front surface of the computing member along with the speaker.

4. The GPS guided walking cane as described in claim 3 wherein the computing member also includes an on/off button, a volume control, and a connection port, which are all collectively in wired communication with the CPU.

5. The GPS guided walking cane as described in claim 4 wherein the on/off button, the volume control, and the connection port are located on individual surfaces, and not on the front surface.

6. The GPS guided walking cane as described in claim 5 wherein connection port enables the computing member to recharge a powering member via a rechargeable/computer input cable.

7. A GPS guided walking cane comprising:
   a walking cane or stick having a pocket thereon for temporary attachment of a computing member thereto;
   wherein the computing member includes a CPU and GPS that are wired to one another;
   wherein the CPU is wired to an inputting member, an outputting member, and a speaker such that a destination is entered therein, and a route planned whereby audible instruction is given as to where to follow along said route while walking with said walking cane or stick;
   wherein the inputting member includes a Braille-based keypad that includes Braille dots either on or adjacent individual keys to communicate the meaning of the respective key when depressed;
   wherein the outputting member includes a plurality of Braille-based output locales thereon; wherein the output locales each include a plurality of dots that can go up or down to form a letter in Braille.

8. The GPS guided walking cane as described in claim 7 wherein the inputting member and the outputting member are both located on a front surface of the computing member along with the speaker.

9. The GPS guided walking cane as described in claim 8 wherein the computing member also includes an on/off button, a volume control, and a connection port, which are all collectively in wired communication with the CPU.

10. The GPS guided walking cane as described in claim 9 wherein the on/off button, the volume control, and the connection port are located on individual surfaces, and not on the front surface.

11. The GPS guided walking cane as described in claim 10 wherein connection port enables the computing member to recharge a powering member via a rechargeable/computer input cable.

* * * * *